United States Patent
Simonelli

[15] 3,679,259
[45] July 25, 1972

[54] SEAT BACK LATCH

[72] Inventor: Chris P. Simonelli, Birmingham, Mich.

[73] Assignee: Ford Motor Company, Dearborn, Mich.

[22] Filed: Nov. 25, 1970

[21] Appl. No.: 92,740

[52] U.S. Cl. ..........................................................297/379
[51] Int. Cl. .........................................................B60n 1/06
[58] Field of Search ................297/379, 378; 5/57 B, 43, 37

[56] References Cited

UNITED STATES PATENTS

| | | | |
|---|---|---|---|
| 1,702,284 | 2/1929 | Thien | 5/37 R |
| 1,747,329 | 2/1930 | Smith | 297/378 X |
| 2,673,593 | 3/1954 | Hendrickson | 297/378 X |
| 3,203,731 | 8/1965 | Krueger | 297/378 X |
| 3,473,176 | 10/1969 | Taylor | 297/379 |
| 3,516,710 | 6/1970 | Sherbert | 297/379 |

*Primary Examiner*—Francis K. Zugel
*Attorney*—John R. Faulkner and John J. Roethel

[57] ABSTRACT

A seat assembly comprising a seat and a seat back pivotally supported thereon and having a latch mechanism for locking the seat back in upstanding position relative to the seat. The latch mechanism includes a portion of a seat back support arm having a cam surface engageable by a complementary cam surface on a cam lock member. The cam lock member, when its cam surface is in abutting relationship to the support arm cam surface, becomes a compression member effective to resist any force tending to tilt the seat back forwardly over the seat.

2 Claims, 3 Drawing Figures

PATENTED JUL 25 1972
3,679,259
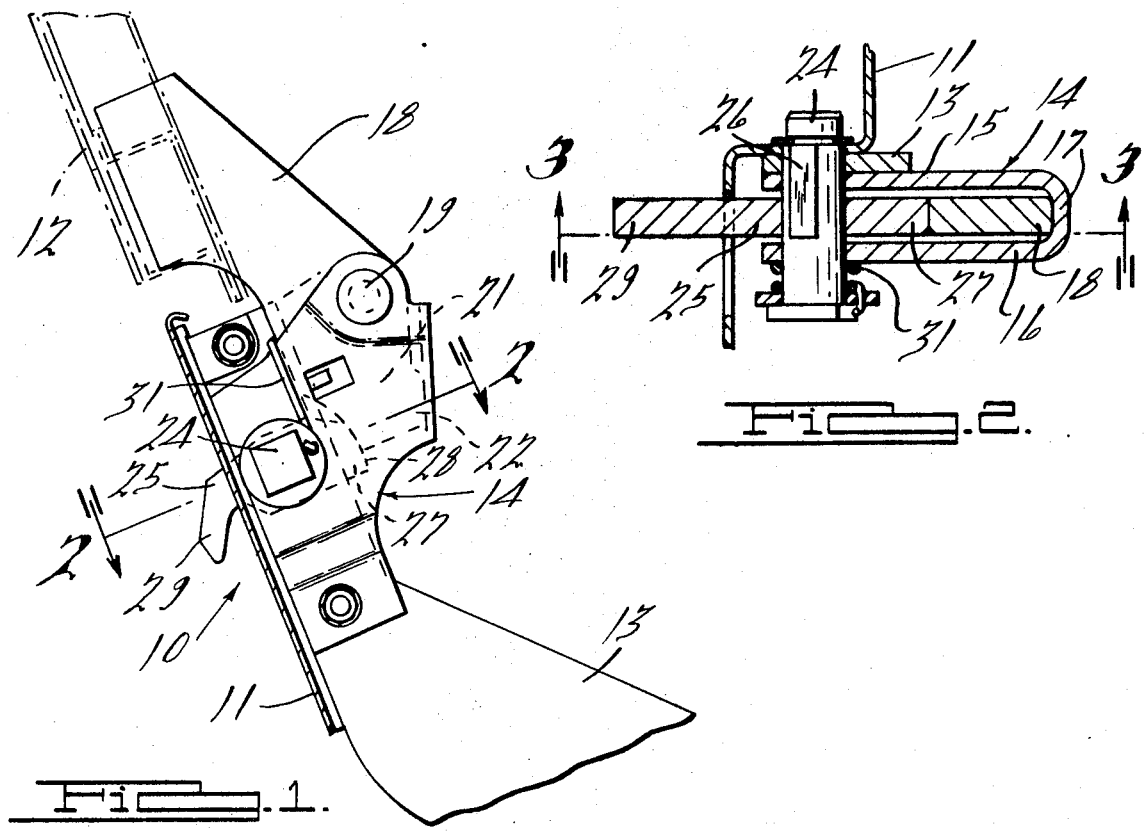
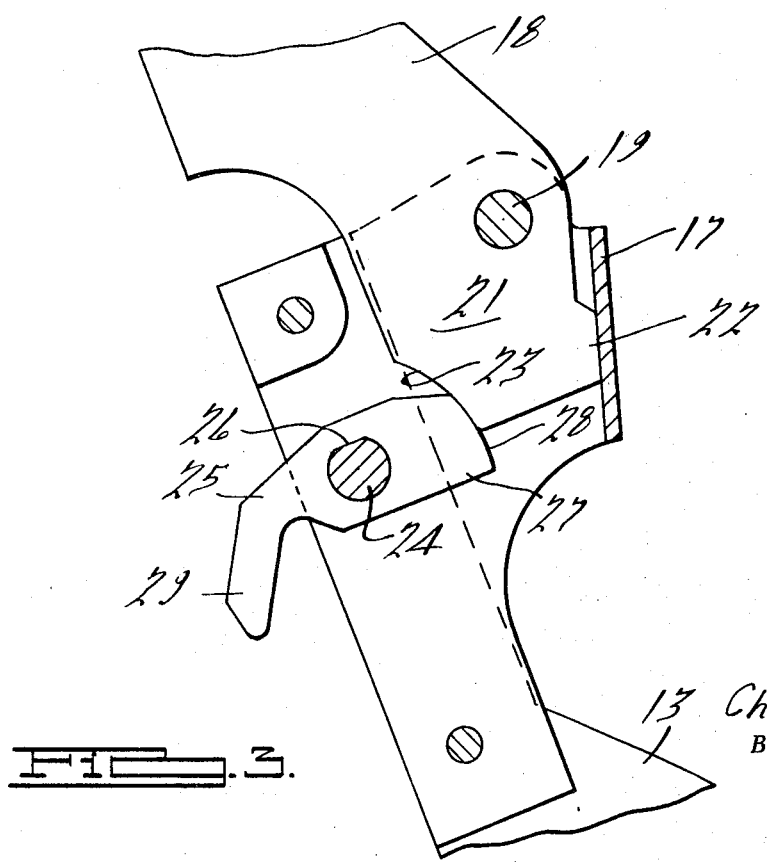
INVENTOR.
Chris P. Simonelli
BY
John R. Faulkner
John J. Roethel
ATTORNEYS.

SEAT BACK LATCH

BACKGROUND OF THE INVENTION

The prior art, as typified by U.S. Pat No. 3,387,885, issued June 11, 1968 to John A. Boschen et al, discloses the incorporation in a vehicle seat assembly of a releasable latch mechanism for holding a pivoted or folding seat back against movement relative to the horizontal seat member. The purpose of the latch mechanism is to prevent the mass of the seat back from shoving a seat occupant in a forward direction upon a "panic stop" or a front end collision of the vehicle. A further purpose is to permit the latched seat back to act under "panic stop" or impact conditions as a cushioned crash barrier against which the rear seat passenger may be thrown with a minimum of injury to himself or to the occupant of the front seat.

Many prior art devices, such as disclosed in the aforementioned patent comprise a latch element in the form of a pin engaging hook or the like. Such prior art hook-type latch elements or the pins with which they are engaged are not believed capable of meeting stress limitations specified for proposed Federal Motor Vehicle Safety Standards. This is because the strength of the hook-type element or pin is to some extent a function of size. Packaging limitations in the seat assembly frequently places a limitation on the size of a hook-type latch element that may be used.

It is an object of the present invention to provide a non-hook type latch element which will have increased stress limitations without incurring a size penalty.

SUMMARY OF THE INVENTION

The vehicle seat assembly embodying the present invention comprises a seat back, a bracket secured to the seat and a support arm on the seat back extending downwardly into juxtaposition to the bracket. The support arm is pivotally coupled to the bracket to provide for forward tilting movement of the seat back over the seat from an upstanding position. The support arm and the bracket have coacting abutment portions which are engageable to position the seat back in its upstanding position.

Incorporated in the seat assembly is a latch mechanism for locking the seat back against forward tilting movement. The latch mechanism includes a portion of the support arm which is provided with a cam surface. A cam lock member is pivotally supported on the bracket and has a cam surface complementary to the support arm cam surface. The cam lock member when its cam surface is in abutting relation to the support arm cam surface is effective to prevent separation of the support arm abutment from the bracket abutment and thereby to prevent forward tilting movement of the seat back over the seat. The cam lock member is movable to a non-locking position relative to the support arm to permit forward tilting of the seat back by a lever which may carry a manual engageable handle or which may be connected to a solenoid mechanism such as disclosed in the aforementioned U.S. Pat. No. 3,387,885.

The operating means for moving the cam lock member to non-locking position includes a spring means normally urging the cam lock member toward locking position. The construction and arrangement of the latch components is such that the cam lock member is under compression rather than under tension as is the usual hook-like latch element, thus avoiding the relative weakness of a hook-type latch element adapted to fit into equal packaging limitations.

DESCRIPTION OF THE DRAWINGS

Further features and advantages of the present invention will be made more apparent as this description proceeds, reference being had to the accompanying drawings, wherein:

FIG. 1 is a side elevation of the latch mechanism as located at the juncture of a vehicle seat - seat back assembly;

FIG. 2 is a sectional view on the line 2—2 of FIG. 1; and

FIG. 3 is an enlarged sectional view on the line 3—3 of FIG. 2.

DETAILED DESCRIPTION OF THE INVENTION

Referring now to the drawings and particularly to FIG. 1, numeral 10 denote part of a motor vehicle seat assembly frame having sheet metal structure 11 which is an integral part of a substantially horizontal seat unit and sheet metal structure 12 which is a part of the seat back unit. Welded to the seat frame 11 is and L-shaped reinforcing plate 13 to which is welded or bolted an upstanding bracket 14 having a substantially U-shaped cross section, as best seen in FIG. 2. The U-shaped bracket section is defined by parallel spaced leg portions 15 and 16 connected by a base or end wall 17.

Secured to the seat back sheet metal 12, as by welding or the like, is a support arm 18 of heavy gauge metal. This support arm 18 extends between the leg portions 15 and 16 of the bracket 14 and is pivotally coupled to the latter by a pivot stud 19 forming the pivot of the seat back to the seat at one side of the seat assembly.

The support arm 18 has a depending extension 21 which extends below the pivot axis of the pivot stud 19. The extension 21 has a foot or abutment 22 which is adapted to abut the inner surface of the bracket base or end wall 17. The abutting relationship between the support arm abutment 22 and the bracket or base end wall 17 determines the normal upstanding relationship of the seat back to the seat.

In a normal at rest condition the relationship of the center of gravity of the seat back to its pivotal support on the seat is such that the seat back will be maintained in an upstanding condition. Under "panic stop" or accident impact deceleration, the seat back will have a tendency to swing forwardly about its pivotal axis. This free swinging movement has the disadvantage that it is likely to add increased impetus to the forward movement of the seat occupant or to destroy the effectiveness of the seat back to act as a cushioned barrier to forward movement of a rear seat occupant under panic stop or accident impact condition. For this reason, Federal Motor Vehicle Safety Standards have been promulgated which require a seat back latch mechanism, such as is disclosed in U.S. Pat. No. 3,387,885.

The object of the present invention is to provide a seat back mechanism of extremely simplified construction yet which is capable of withstanding stresses of even higher magnitudes than that of the latch mechanism shown in the cited patent. Further, the improved latch mechanism is able to do this without any penalty as to the amount of space required for its installation.

As best seen in the enlarged FIG. 3, the latch mechanism comprises a concave arcuate cam surface 23 on the support arm extension 21, the cam surface 23 being on the side of the extension opposite the one carrying the abutment 22. The bracket 14 carries a pivot shaft 24 to which a cam lock member 25 is coupled. The cam lock member 25 is held against movement relative to the shaft 24 by coacting flat surfaces 26 on the shaft 24 and the shaft receiving aperture in the cam lock member 25.

The cam lock member 25 has at its end 27 proximate the support arm extension 21 a convex arcuate cam surface 28 substantially complementary to the concave arcuate cam surface 23. When the cam lock member 25 is in the FIG. 3 position, the cam lock member holds the support arm extension abutment 22 against the bracket wall 17. This, in effect, renders the support arm 18 and the seat back 12 mounted thereon immovable in a forward direction about the pivot axis 19. The cam lock member 25, or at least the end 27 between the pivot shaft 24 and the engaged cam surfaces 23 and 28, becomes a compression member resisting counterclockwise movement of the support arm 18 about the pivot axis 19, as viewed in the drawing.

The cam lock member 25 is provided with a depending handle 29 by which it may be swung in a clockwise or cam surface disengaging direction, as viewed in the drawing. With the cam surface 28 out of the path of the cam surface 23, the seat back 12 can be tilted forward to provide access to the rear passenger seat.

Upon release of the handle 29, a spring 31 encompassing the pivot shaft 24 urges or restores the shaft and thereby the cam lock member 25 into locking position as soon as the abutment 22 engages the inner surface of the bracket end wall 17.

It is to be understood that this invention is not limited to the exact construction illustrated and described above, but that various changes and modifications may be made without departing from the spirit and scope of the invention as defined by the following claims.

I claim:

1. A vehicle seat assembly comprising a seat and a seat back,
   a bracket secured to the seat,
   a support arm on the seat back extending downwardly into juxtaposition to the bracket,
   pivot means pivotally coupling the support arm to the bracket to provide for forward tilting movement of the seat back over the seat from an upstanding position,
   and coacting abutments on the support arm and bracket engageable to position the seat back in its upstanding position,
   wherein the improvement comprises:
   a latch mechanism for locking the seat back against forward tilting movement,
   the latch mechanism including an extension of the support arm having a cam surface thereon,
   the support arm extension extending, when the seat back is in an upstanding position, below the pivot means coupling the support arm to the bracket,
   a cam lock member pivotally supported on the bracket and having a cam surface complementary to the support arm cam surface,
   the pivot axis of the cam lock member being below the pivot axis of the support arm,
   the cam lock member, when its cam surface is in abuting relationship to the support arm surface, being effective to prevent separation of the support arm abutment from the bracket abutment and thereby to prevent forward tilting movement of the seat back over the seat,
   the coacting support arm cam surface and the cam lock member cam surface in engaged position lying between the support arm pivot means and the cam lock pivot axis whereby the cam lock member is placed under compression by any force tending to tilt the seat back forwardly,
   and operating means for pivoting the cam lock member to nonlocking position relative to the support arm to permit forward tilting movement of the seat back.

2. A vehicle seat assembly having separate seat and seat back frames,
   a U-shaped bracket secured to the seat frame,
   a support arm on the seat back frame extending downwardly between the legs of the U-shaped bracket,
   pivot means pivotally coupling the support arm to the bracket for pivotal movement about a substantially horizontal axis,
   an extension on the support arm projecting beyond the pivot means into the bracket having an abutment surface engageable with the base of the U-shaped bracket to determine the seat back frame upstanding position,
   the support arm extension having a cam surface on the side opposite the abutment surface,
   a cam lock member pivotally supported below the support arm pivot axis on the bracket and having a cam surface complementary to the support arm extension cam surface,
   the cam lock member being pivotal about its pivot axis into a position in which the cam surface abuts the extension cam surface when the extension is in abuting relation to the bracket base whereby the seat back frame is locked in its upstanding position,
   the coacting support arm and cam lock member cam surfaces in engaged position lying between the respective pivot axes whereby the cam lock member is placed under compression by any force tending to tilt the seat back frame forwardly,
   and operating means for pivoting the cam lock member to nonlocking position relative to the support arm to permit forward tilting movement of the seat back frame over the seat frame.

* * * * *